United States Patent
Willner et al.

(10) Patent No.: US 6,202,484 B1
(45) Date of Patent: *Mar. 20, 2001

(54) METHOD AND DEVICE FOR DETERMINING A LIQUID LEVEL WITH THE AID OF ULTRASONIC PULSES

(75) Inventors: Siegfried Willner, Lichtenfels; Michael Eisentraudt, Stockheim, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,132

(22) Filed: Jul. 3, 1998

Related U.S. Application Data

(63) Continuation of application No. PCT/DE96/02433, filed on Dec. 17, 1996.

(30) Foreign Application Priority Data

Jan. 3, 1996 (DE) .............................................. 196 00 097

(51) Int. Cl.$^7$ ................................................... G01F 23/28
(52) U.S. Cl. ......................................................... 73/290 V
(58) Field of Search .......................................... 73/290 V

(56) References Cited

U.S. PATENT DOCUMENTS

| | | |
|---|---|---|
| 3,394,589 | 7/1968 | Tomioka . |
| 4,748,846 | 6/1988 | Haynes . |
| 4,805,453 | * 2/1989 | Haynes .................................. 73/292 |
| 5,095,748 | 3/1992 | Gregory et al. . |
| 5,127,266 | 7/1992 | Maresca et al. . |
| 5,263,371 | * 11/1993 | Maresca, Jr. et al. ............. 73/290 V |

FOREIGN PATENT DOCUMENTS

| | | |
|---|---|---|
| 41 26 063 A1 | 2/1992 | (DE) . |
| 0 106 677 | 4/1984 | (EP) . |
| 0 138 541 A1 | 4/1985 | (EP) . |
| 223023 | * 12/1983 | (JP) .................................. 73/290 V |

OTHER PUBLICATIONS

International patent Application WO 91/02950 (Däges et al.), dated Mar. 3, 1991.

* cited by examiner

*Primary Examiner*—Hezron Williams
*Assistant Examiner*—W. Morris Worth
(74) *Attorney, Agent, or Firm*—Herbert L. Lerner; Laurence A. Greenber; Werner H. Stemer

(57) ABSTRACT

A method for determining a liquid level with the aid of ultrasonic pulses improves the measuring accuracy of the liquid level in a container with an echo time measurement of ultrasonic pulses and a mean sound velocity. The mean sound velocity is extrapolated from at least two reference sound velocities in the liquid. In this way it is possible to achieve a measuring accuracy of less than a millimeter, independently of the liquid level. A device for carrying out the method has a main measuring path, at least one device for transmitting and receiving ultrasonic pulses, at least two reference paths for determining sound velocities, and a computer unit. The computer unit extrapolates from the sound velocities to the mean sound velocity.

16 Claims, 3 Drawing Sheets

METHOD AND DEVICE FOR DETERMINING A LIQUID LEVEL WITH THE AID OF ULTRASONIC PULSES

CROSS-REFERENCE TO RELATED APPLICATION

This application is a continuation of International Application PCT/DE96/02433, filed Dec. 17, 1996, which designated the United States.

BACKGROUND OF THE INVENTION

FIELD OF THE INVENTION

The invention relates to a method for determining a liquid level in a container from an echo time measurement of ultrasonic pulses and a mean sound velocity. The invention also relates to a device for carrying out the method, having a computer unit which extrapolates from reference sound velocities to the mean sound velocity and is used to calculate the liquid level.

A particularly exact determination of the liquid level is required, for example, in the case of an underground dispensing system for fuel or generally in the case of a container for dangerous substances. In that case stringent environmental conditions require virtually any leakage to be detected and removed. In the case of a large tank with a cross-sectional area of 1 to 10 $m^2$, even an erroneous measurement of the liquid level of only 1 mm leads to an erroneous determination of a liquid volume of 1 to 10 l.

A contactless ultrasonic measuring system which is known for the purpose of monitoring a fuel tank determines the liquid level with the aid of an echo time measurement of ultrasonic pulses, reflected at a liquid surface, in accordance with the echo sounding principle. It is known, moreover, to make use of a piezoceramic ultrasonic transducer which is suitable as a single component both for transmitting and for receiving ultrasonic pulses, for the purpose of measuring the echo time.

In order to calculate the filled level from the measured echo time, it is necessary to know the velocity of propagation of the ultrasonic pulses in the liquid. However, it is precisely in a large container such as a fuel dispensing system, that the density and the temperature in the liquid are not constant over the entire container volume. Rather, a density and temperature gradient forms in the vertical direction.

Since the sound velocity is a function of density and temperature, it is necessary to perform a correction of the sound velocity in order to determine the liquid level with a tolerance in the mm range. Again, no general specification of the sound velocity is possible for inhomogeneous liquids having a composition which fluctuates.

A solution which is known from U.S. Pat No. 4,748,846 is to measure the sound velocity with the aid of reference paths of known length directly in the liquid. For that purpose, additional reflectors for ultrasound are disposed at prescribed spacings in the vertical direction along the actual measuring path, along which an ultrasonic transducer emits. In order to calculate the liquid level, use is made of a mean sound velocity of liquid determined with the aid of the reflector respectively located closest to the liquid surface. That is an average sound velocity, since averaging is performed in the vertical direction over the height.

U.S. Pat. No. 3,394,589 also discloses the determination of a liquid level in a container from an echo time measurement of ultrasonic pulses and a mean sound velocity.

The accuracy achievable with the method becomes greater, with a smaller spacing between the successive reflectors.

However, as a disadvantage it is necessary to distinguish between reflections from the liquid surface and reflections from fixed reflectors, in a complicated signal detection method with the assistance of electronic masking times.

Limits to the achievable accuracy are therefore set. That holds even when reflectors are disposed separately next to the actual measuring path (U.S. Pat. No. 5,095,748), since even then the reflectors cannot be disposed at any desired density because of multiple reflections.

SUMMARY OF THE INVENTION

It is accordingly an object of the invention to provide a method and a device for determining a liquid level with the aid of ultrasonic pulses, which overcome the hereinaforementioned disadvantages of the heretofore-known methods and devices of this general type, in which the method determines a liquid level in a container from an echo time measurement of ultrasonic pulses and a mean sound velocity and in particular achieves a measuring accuracy of less than one millimeter independently of the liquid level, and in which the device carries out the method with the aid of particularly expedient and simple measures.

With the foregoing and other objects in view there is provided, in accordance with the invention, a method for determining a liquid level in a container from an echo time measurement of ultrasonic pulses and a mean sound velocity, which comprises measuring a reference sound velocity for each of at least two reference paths located in a liquid; determining a characteristic of a mean sound velocity in the vertical direction over a height by extrapolation from the at least two reference sound velocities; and using the characteristic to reach a conclusion beyond actual measuring points concerning the mean sound velocity averaged up to a liquid level, and determining the liquid level therefrom by an echo time of ultrasonic pulses reflected at a liquid surface.

In this case the invention proceeds from the finding that temperature and density are varying but continuous functions in the liquid, in particular in the vertical direction. As a result, a continuous variation in the sound velocity in the vertical direction is also to be expected in the liquid. The sound velocity in the liquid can therefore be described as a function of the level above the container floor. This function can be determined and the variation of the sound velocity can thereby be extrapolated beyond the measuring points by measuring at least two reference sound velocities at different levels in the container. In particular, it thereby becomes possible to specify very exactly the mean sound velocity averaged in the vertical direction from the container floor up to the liquid level. It is likewise also possible to determine the characteristic of the mean sound velocity over height by measuring at least two reference sound velocities from the vertically aligned reference paths of different length with the same base point, and to extrapolate from this characteristic to the mean sound velocity averaged up to the liquid level.

In accordance with another mode of the invention, the determination of the liquid level takes place recursively by determining from an estimated value for the liquid level an approximated mean sound velocity which is used for recursive improvement of the estimated value for the liquid level, and the improved estimated value is equated to the liquid level. As a result of this method, the estimated value for the liquid height approaches the actual value asymptotically. The method can be terminated once the desired accuracy for the liquid level has been reached. As a rule, the estimated value of the liquid level is already corrected in the submillimeter range in a second path, with the result that it is possible to achieve a measuring accuracy of 1 mm for the liquid level after termination of the method after the first path.

In accordance with a further mode of the invention, it is particularly elegant and less computation-intensive when the extrapolation of the mean sound velocity includes a linear approximation. Since, as a rule, the characteristic of the sound velocity is not linear over height, a skillful selection of the measuring points is preferably made. In this case, two measuring points are sufficient, in particular, for reference sound velocities if one measuring point is located in the vicinity of the container floor and one measuring point is located in the vicinity of the liquid surface. The average sound velocity is yielded in this case by integrating the approximated linear characteristic of the sound velocity over height. However, it is also possible to determine the characteristic of the mean sound velocity directly with the aid of vertical reference paths. It is skillful in this case to use the shortest and the longest reference path which still dips in as a measuring range.

In accordance with an added mode of the invention, due to temperature fluctuations it is possible, precisely in long-life liquid containers, for water which can collect as a sump on the container floor to condense. Such a sump can also be produced by deposition of already existing pollutants in the liquid. Premature cleaning of the container can be avoided if, in the event of pollution gathering below an interface with the liquid in a sump, a sump level in the container is determined by reflection of ultrasonic pulses at the interface. By determining the sump level, it is possible to wait with reference to the state until a specific sump level is actually reached. The liquid level is yielded by subtracting the sump level.

In accordance with an additional mode of the invention, a liquid volume is determined from the liquid level for a dispensing system in which the amount dispensed is metered volumetrically. In order to convert the liquid level into the liquid volume, either use is made of the exact geometry of the container, or a relevant relationship is set up between stepwise filling or emptying of the container ("adding liter by liter"), for example with the aid of a suitable flow meter.

In accordance with yet another mode of the invention, since the liquid volume depends on temperature, it is advantageous for the purpose of avoiding erroneous dispensing if the liquid volume is subjected to temperature normalization with the aid of a mean temperature, wherein the mean temperature is determined by integrating a vertical temperature characteristic measured in the liquid.

With the objects of the invention in view there is also provided a device for determining a liquid level in a container from an echo time measurement of ultrasonic pulses along a main measuring path situated between a first and a second end, comprising at least one device for transmitting and receiving ultrasonic pulses; at least two reference paths, located in the liquid during operation, for determining respective reference sound velocities; and a computer unit for determining a characteristic of a mean sound velocity in the vertical direction over a height by extrapolation from the at least two reference sound velocities, reaching a conclusion from the characteristic beyond actual measuring points concerning the mean sound velocity averaged up to the liquid level, and determining the liquid level therefrom by an echo time of the ultrasonic pulses reflected at a liquid surface.

The device is aligned for the purpose of measurement in such a way that the main measuring path is aligned vertically in a liquid. In this configuration, the first end of a device is located at a fixed spacing from the container floor.

In accordance with another feature of the invention, reflectors for ultrasound are disposed next to one another at prescribed spacings in a row in parallel next to the main measuring path between the first and the second end. As already described, these reflectors may be used to directly determine the characteristic of the mean sound velocity over the height from the container floor. In addition, due to the configuration which is offset in parallel, it is easy to distinguish between ultrasonic pulses reflected at a liquid surface and at a reflector. In order to also permit different reflectors to be distinguished, the spacings between the reflectors should not be integral multiples of one another. In addition, a slim construction of the device is rendered possible, with the result that the latter can also be fitted subsequently in a closed container having narrow filling stubs or a narrow ventilation opening.

In accordance with a further feature of the invention, in order to determine a mean temperature in the liquid, which is required for temperature normalization of a liquid volume, a plurality of temperature sensors are disposed next to one another at prescribed spacings between the first and the second end.

In accordance with an added feature of the invention, a first guide tube surrounds the main measuring path, a second guide tube surrounds the reference paths and a third guide tube surrounds the temperature sensors, and each guide tube has openings through which the interior of the respective guide tube communicates with the surrounding liquid during operation. The emitted ultrasonic pulses are propagated directionally in each case due to the laying of the measuring paths in the guide tubes. In this way, the intensity of reflective pulses is increased, with the result that it is still possible to measure even relatively long paths which could no longer be measured in the case of free propagation.

In addition, the guide tubes produce a high stability of the device, simultaneously in conjunction with a slim device. If the three guide tubes are connected to one another, the cavity produced between the tubes can be used for reliable laying of connecting cables.

In accordance with an additional feature of the invention, the echo times are measured in a particularly simple way by virtue of the fact that the device for transmitting and receiving ultrasonic pulses is constructed as an ultrasonic transducer which, as already mentioned, is suitable as a single component both for transmitting and for receiving ultrasonic pulses.

In accordance with yet another feature of the invention, a respective separate ultrasonic transducer is disposed at the first end of each guide tube, the ultrasonic transducers in the first and second guide tube are disposed for emission in the direction of the second end, and the ultrasonic transducer in the third guide tube is disposed for emission in the direction of the first end. During operation of the device, the first end is located at a defined spacing from the container floor in the liquid. The ultrasonic transducer disposed in the first guide tube serves for echo time measurement of ultrasonic pulses reflected at the liquid surface during operation of the device. Reference sound velocities can be determined with the aid of a second ultrasonic transducer. Due to the fact that the ultrasonic transducer disposed in the third guide tube emits in the opposite direction, it is possible to determine by reflection both a sump level and the spacing from the container floor if no sump has yet collected.

Since ultrasonic transducers do not emit an individual pulse, but a sequence of ultrasonic pulses of decaying intensity, when a voltage pulse is applied, a physical dead time arises between transmission and reception. When converted to a path length, the dead time corresponds as a rule to approximately 10 cm.

In accordance with yet a further feature of the invention, in order to use the ultrasonic transducer in the third guide tube to measure even sump levels below 10 cm, the ultrasonic transducer in the third guide tube is disposed offset towards the second end by comparison with the ultrasonic transducer in the first guide tube. If the sump level rises above the ultrasonic transducer in the first guide tube, the sump level can optionally also be detected with the aid of the ultrasonic transducer.

Since ultrasonic pulses are attenuated in the liquid, as a rule a reflected signal can be detected at most up to a distance of 2 m between the reflective layer and the transmitter or receiver.

In accordance with yet an added feature of the invention, in order to also be able to measure liquid levels in excess of this, an additional ultrasonic transducer for emitting in the direction from the first to the second end is disposed at the second end in the guide tube of the reference paths. If the liquid rises above the ultrasonic transducer, the latter can be used instead of the ultrasonic transducer at the first end in order to determine the liquid level.

In accordance with yet an additional feature of the invention at least one reflector is located in the direction from the first to the second end downstream of the ultrasonic transducer, for the extrapolation of the mean sound velocity.

In accordance with a concomitant feature of the invention, for mechanical stability and for the vertical alignment of the device, one of the guide tubes is constructed as a hollow support arm which, during operation, projects from the container and includes a spherical joint for fastening and vertically aligning the device. The hollow support arm projecting from the container during operation can be used for installing an electronic system which drives and evaluates the ultrasonic transducers and the temperature sensors.

Other features which are considered as characteristic for the invention are set forth in the appended claims.

Although the invention is illustrated and described herein as embodied in a method and a device for determining a liquid level with the aid of ultrasonic pulses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
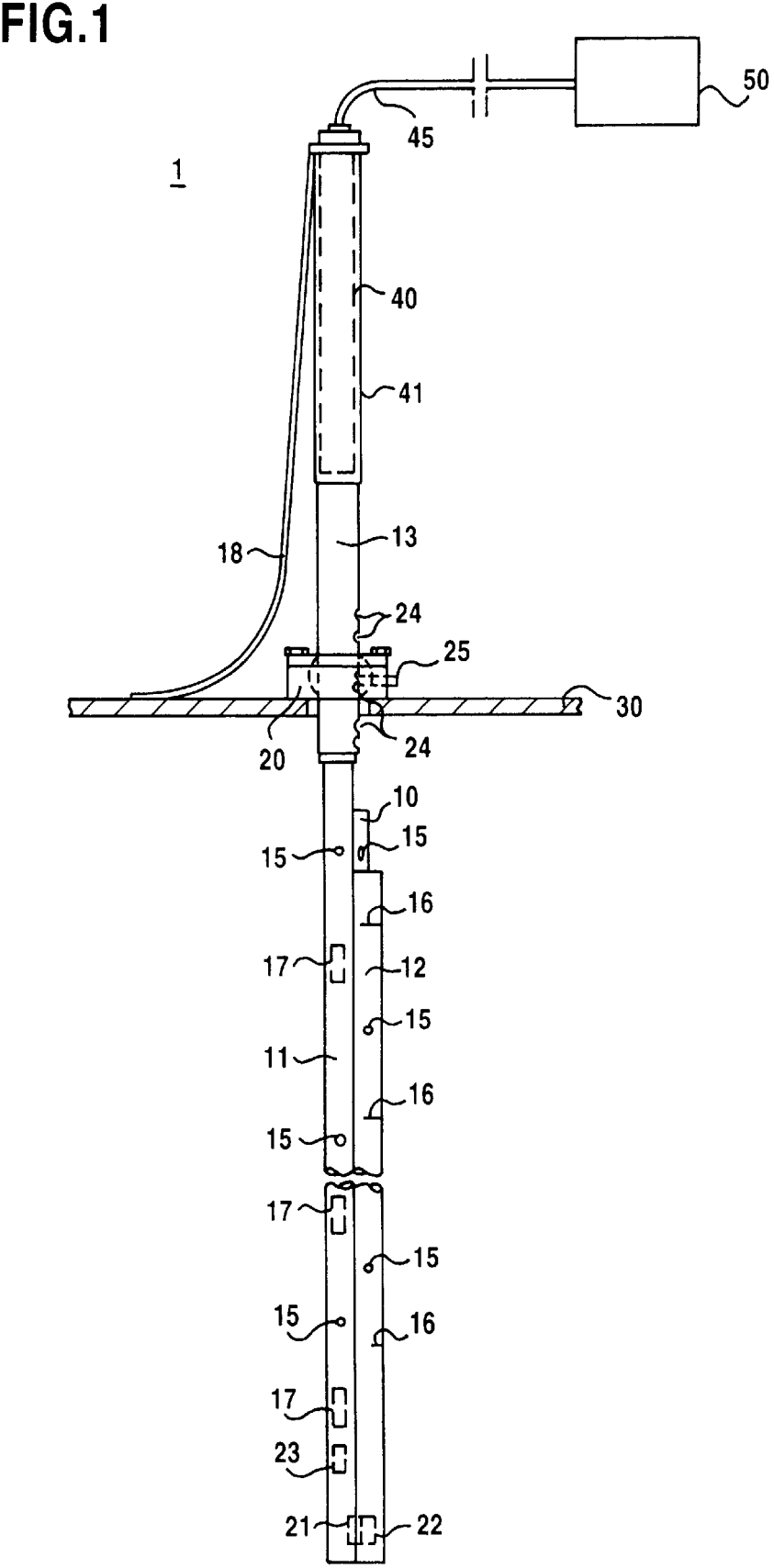
FIG. 1 is a fragmentary, diagrammatic, partly sectional view of a measuring device for determining a liquid level in a container, preferably for fuel containers, according to the method of the invention.

Referring now to the figures of the drawings in detail and first, particularly, to FIG. 1 thereof, there is seen a measuring device 1 which includes a measuring tube 10, a main tube 11 and a reference tube 12. A spherical joint 20 which is located at an upper end of the main tube 11 simultaneously serves the purpose of vertical alignment when the measuring device 1 is fastened to a container. In order to simplify matters, only a container cover 30 of the container is illustrated. The spherical joint 20 can be displaced axially along a hollow support arm 13 with the aid of cutouts 24 and a setscrew 25.

The main tube 11 is constructed as the hollow support arm 13 above the container cover 30, for holding an electronic probe system 40. A slidable sleeve 41 is mounted over the hollow support arm 13 for the purpose of easily exchanging the electronic probe system 40. A control line 45 is provided for connecting the electronic probe system 40 to a computer unit 50. The computer unit 50 is fitted separately outside the measuring device 1. In order to equalize potential, the measuring device 1 is provided with lightning protection through the use of a lightning arrestor 18. Installation is thereby possible on a tank which is not at ground potential (for example on a tank having a cathode protection device).

Each of the three tubes 10, 11, 12 are constructed as sound guidance tubes having openings 15 through which the interior of the first, second and third sound guidance tubes 10, 12, 11 communicate with a surrounding liquid during operation. Ultrasonic transducers 21 and 22 having upwardly directed emitting surfaces are each fitted into the interior of a respective one of the measuring tube 10 and the reference tube 12. A further ultrasonic transducer 23 which is fitted into a lower end of the interior of the main tube 11, has an emitting surface which points downwards. The ultrasonic transducer 23 is offset upwards by 10 cm in this configuration, in comparison with the two ultrasonic transducers 21, 22, which are located at the same level.

Three reflectors 16 for ultrasound are fastened in the interior of the reference tube 12 at spacings of 30 cm, 75 cm and 130 cm relative to the ultrasonic transducer 22. The horizontal extent of the reflectors 16, which are constructed in the form of flat metal plates, increases with increasing spacing from the ultrasonic transducer 22.

Three temperature sensors 17 are also disposed in the interior of the main tube 11 at the same spacings from one another.

The electronic probe system 40 integrated into the hollow support arm 13 drives the ultrasonic transducers 21, 22 and 23 as well as the temperature sensors 17, and reads out the latter. Data which are thereby determined are relayed to the computer unit 50 in the form of electric voltage signals, over the control line 45.

The overall diameter of the interconnected sound guidance tubes 10, 11, 12 is smaller than two inches in the exemplary embodiment. In addition, the spherical joint 20 has a two-inch thread in accordance with DIN ISO 228/1/G2 at the lower end. As a result, the measuring device 1 is adapted to the standardized structures of fuel tanks at gas stations. The device can be inserted into the fuel tank subsequently without any difficulty through a standardized two-inch opening of a dome cover and screwed to the tank.

Figure 2:
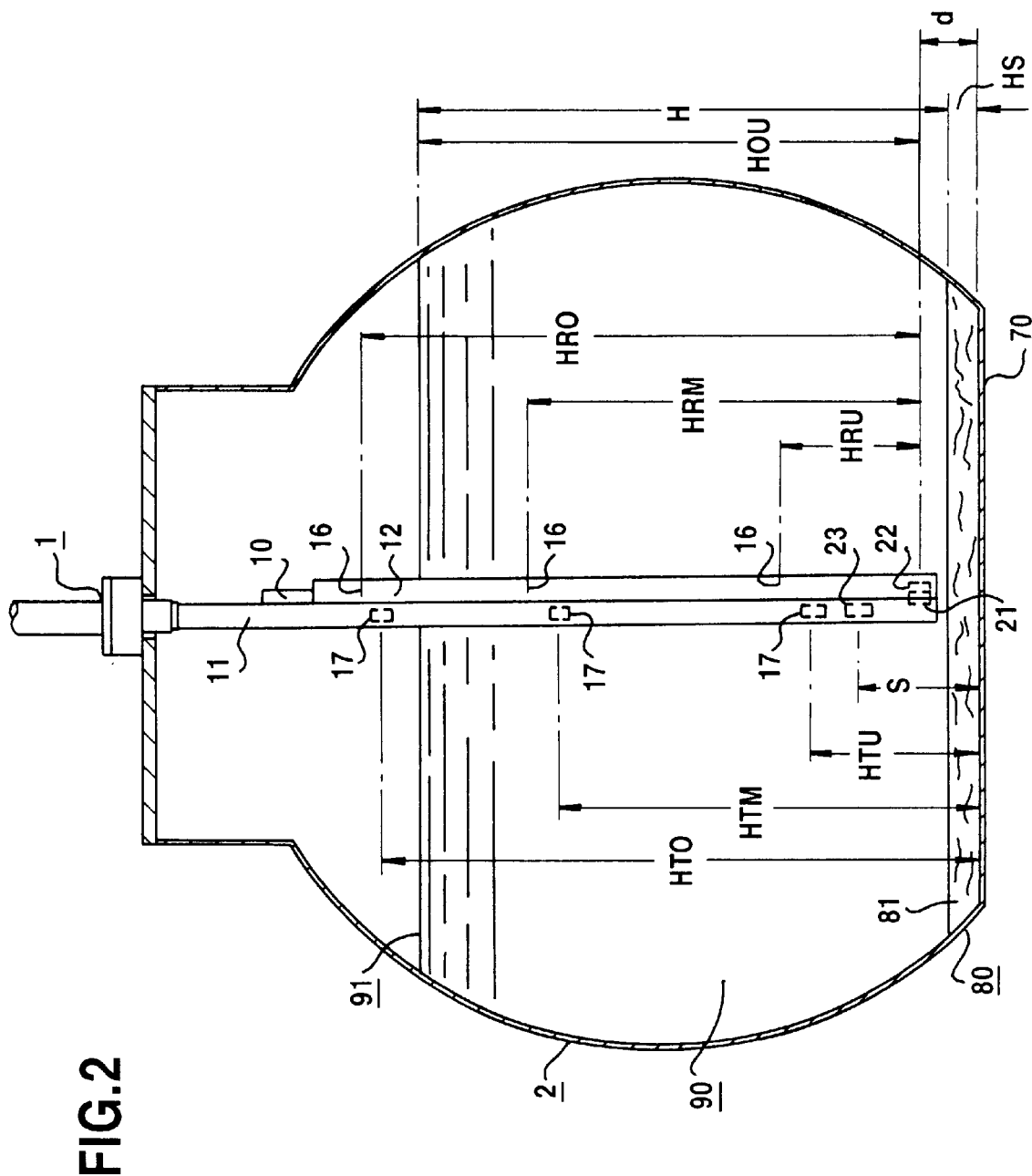
FIG. 2 is a fragmentary, partly sectional view of a configuration of the measuring device in the container during operation, with a specification of measured variables being used.

FIG. 2 shows the measuring device 1 during a measuring operation, in which it is vertically aligned in a container 2.

A sump 80 having a sump level HS up to an interface 81 with a liquid 90 has formed on a container floor 70. The liquid 90 extends in the container 2 with a liquid level H up to a liquid surface 91. The ultrasonic transducers 21 and 22 are located at a spacing d from the container floor 70.

The reflectors 16 are located at respective spacings HRO, HRM and HRU above the ultrasonic transducer 22 inside the reference tube 12. The temperature sensors 17 are fastened at respective spacings HTO, HTM and HTU above the container floor 70 along the main tube 11. All of the spacings are measured or calculated independently when the measuring device is newly installed. For this purpose, the ultrasonic transducer 23 is used to determine its spacing S from the container floor 70, and thus also the spacing d of the ultrasonic transducers 21 and 22 from the container floor 70.

During measuring operation according to FIG. 2, the ultrasonic transducer 21 emits ultrasonic pulses at a clock frequency of 83 Hz along the measuring tube 10, and detects reflected ultrasonic pulses at a liquid surface in accordance with an echo time tH.

The ultrasonic transducer 22 is driven similarly at a clock frequency of 83 Hz and emits along the reference tube 12. Echo times corresponding to an individual reflector 16 are determined with the aid of electronic measuring windows which permit the detection of returning ultrasonic pulses in accordance with a time elapsed since the instant of emission. The same method is also used to detect which reflector 16 is still located in the liquid in the case of a dropping liquid level, since reflection at the liquid surface 91 generates an additional echo signal between the expected instants of detection of two neighboring reflectors 16.

Figure 3:
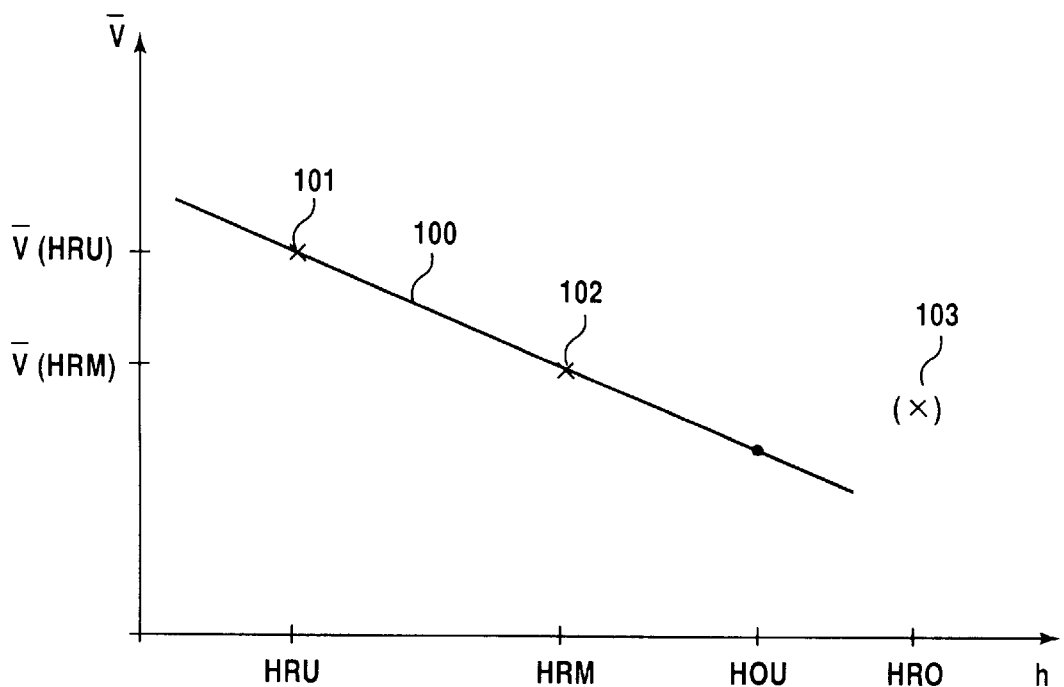
FIG. 3 is a graph of a first diagram of a mean sound velocity $\bar{v}$ in a liquid, as a function of height.

The characteristic of a mean sound velocity $\bar{v}(h)$, wherein h denotes the height above the ultrasonic transducer 22, is determined with the aid of a linear regression line 100 according to FIG. 3, using two of three possible measuring points 101, 102 and 103. According to FIG. 2, use is made for this purpose of the reflector 16 with the spacing HRU and, depending on the liquid level H, of the last reflector 16 that is still immersed, that is to say the reflector 16 at the spacing HRM in the case illustrated. The following formula results:

$$\bar{v}(h) = \bar{v}(HRU) + \frac{(h - HRU)}{(HRM - HRU)} \cdot (\bar{v}(HRM) - \bar{v}(HRU))$$

The sump level HS is determined with the aid of the ultrasonic transducer 23 by reflection at the interface 81.

A spacing HOU of the liquid surface 91 from the ultrasonic transducer 21 is determined recursively with the aid of the mean sound velocity $\bar{v}(h)$ in accordance with the following formulas:

$$HOU_{(1)} = HRM$$

$$HOU_{(i)} = \bar{v}(HOU_{(i-1)}) \cdot tH$$

$$HOU = HOU_{(i)}.$$

The first step is to use the spacing of the last reflector 16 that is still immersed, from the ultrasonic transducer 22, that is to say the spacing HRM in the example illustrated in accordance with FIG. 2, as an estimated value $HOU_{(1)}$ for the spacing HOU. The estimated value is improved step by step with the aid of the relationship $\bar{v}(h)$ and the determined echo time tH of ultrasonic pulses reflected at the liquid surface 91. The improved estimated value $HOU_{(i)}$ is equated to the spacing HOU.

In the exemplary embodiment of the invention, the above iteration method is terminated after the first improvement (that is to say i=2), since an accuracy of less than 1 mm has already been reached in this case. The liquid level H in the container is yielded from the calculated values in accordance with the formula:

$$H = HOU + d - HS.$$

A liquid volume is calculated by conversion from the liquid level H. For this purpose, the exactly prescribed geometry of the container is optionally input into the computer unit, or a container characteristic is set up with the aid of a calibrated flow meter by emptying or filling the container in a stepwise manner.

Figure 4:
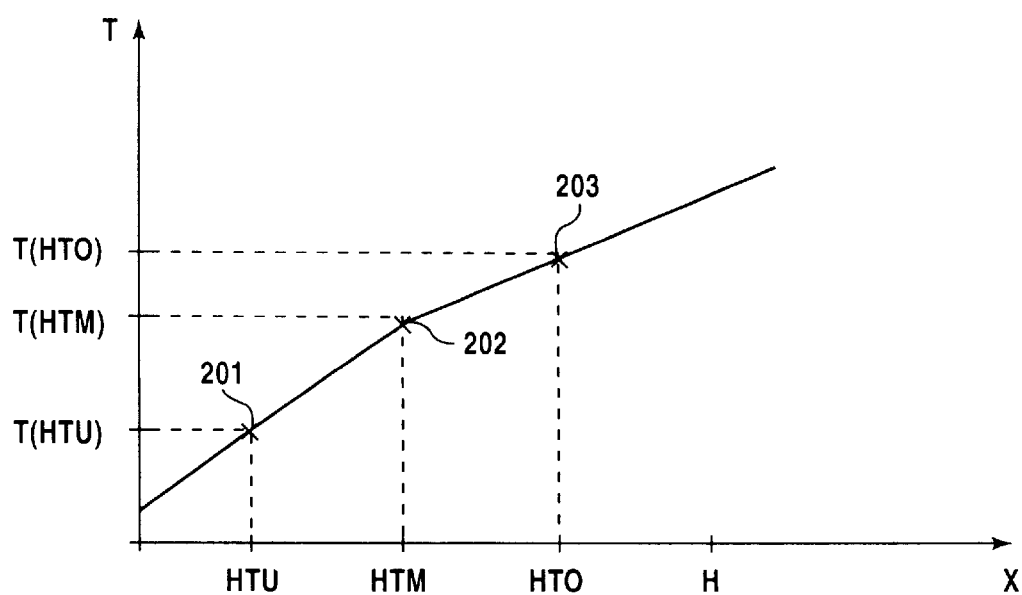
FIG. 4 is a graph of a second diagram of a temperature characteristic in the liquid as a function of height.

Measuring points 201, 202 and 203 which are determined with the aid of the temperature sensors 17 are plotted in FIG. 4, wherein x denotes a spacing from the container floor 70. A temperature characteristic between the measuring points is calculated with the aid of linear interpolation.

The integral theorem is used to determine a mean temperature TM, with the aid of the following formula:
a) Three immersed temperature sensors:

$$TM \cdot H = \int_O^{HTM} \left[ T(HTU) + \frac{(x - HTU)}{(HTM - HTU)} \cdot (T(HTM) - T(HTU)) \right] dx +$$

$$\int_{HTM}^{H} \left[ T(HTM) + \frac{(x - HTU)}{(HTO - HTM)} (T(HTO) - T(HTM)) \right] dx$$

$$TM = \frac{1}{H} \left[ \frac{HTM^2}{2(HTM - HTU)} \cdot T(HTM) + \left( H - HTM + \frac{HTM^2}{2(HTM - HTU)} \right) - \right.$$

$$\left. \frac{HTM - HTU}{(HTM - HTU)} - \frac{(H - HTM)^2}{2(HTO - HTM)} \right).$$

$$\left. T(HTM) + \frac{(H - HTM)^2}{2(HTO - HTM)} \cdot T(HTO) \right]$$

b) Two immersed temperature sensors:

$$TM - H = \int_O^{H} \left[ T(HTU) + \frac{(x - HTU)}{(HTM - HTU)} \cdot (T(HTM) - T(HTU)) \right] dx$$

$$TM = \frac{(2HTM - H)}{2(HTM - HTU)} \cdot T(HTU) + \frac{(H - 2HTU)}{2(HTM - HTU)} \cdot T(HTM)$$

c) One immersed temperature sensor:

$$TM = T(HTU)$$

A filling volume normalized to 15° C. is calculated with the aid of a temperature-dependent density of the liquid 90.

We claim:

1. A method for determining a liquid level in a container from an echo time measurement, which comprises:
   measuring respective reference sound velocities along at least two reference paths located in a liquid;
   determining a characteristic of a mean sound velocity in the vertical direction up to the liquid level by extrapolation from the reference sound velocities; and
   using the characteristic to determine the mean sound velocity in the vertical direction averaged up to the liquid level, and determining the height to the liquid level by correlating an echo time of ultrasonic pulses reflected at a liquid surface at the liquid level with the mean sound velocity averaged up to the liquid level.

2. The method according to claim 1, which comprises carrying out the step of determining the liquid level recursively by determining the mean sound velocity for an estimated value for the liquid level from the characteristic of the mean sound velocity over height, determining an improved estimated value for the liquid level therefrom by multiplying by the echo time, equating the improved estimated value to the estimated value of the liquid level, redetermining an improved estimated value therefrom, and equating the improved estimated value to a value of the liquid level, if the improved estimated value and the estimated value differ by less than a desired accuracy for the liquid level.

3. The method according to claim 1, which comprises carrying out the step of determining the characteristic of the mean sound velocity by a linear approximation.

4. The method according to claim 1, which comprises determining a sump level in the container by reflection of ultrasonic pulses at an interface with the liquid in a sump, in the event of pollution gathering below the interface.

5. The method according to claim 1, which comprises determining a liquid volume from the liquid level.

6. The method according to claim 5, which comprises subjecting the liquid volume to temperature normalization with the aid of a mean temperature, and determining the mean temperature by integrating a vertical temperature characteristic measured in the liquid.

7. In a device for determining a liquid level in a container from an echo time measurement, the improvement comprising:

a main measuring path and at least two reference paths;

at least one transducer device located at one end of said main measuring path and at one end of said at least two reference paths for transmitting and receiving ultrasonic pulses;

said at least two reference paths having at least one reflector device located in the liquid for determining respective reference sound velocities between said at least one transducer device and said at least one reflector device located in the liquid along said at least two reference paths; and a computer unit for determining a characteristic of a mean sound velocity in the vertical direction up to a liquid level by extrapolation from the reference sound velocities of said at least two reference paths, said computer unit determining the liquid level from the echo time of the ultrasonic pulses reflected at a liquid surface and the mean sound velocity in the vertical direction up to said liquid level.

8. The device according to claim 7, including reflectors for ultrasound disposed next to one another at prescribed spacings in a row in parallel next to the measuring path, along which at least one transducer device emits.

9. The device according to claim 7, including a plurality of temperature sensors disposed next to one another at prescribed spacings in the vertical direction, each of said temperature sensors having an output transmitting to said computer unit.

10. The device according to claim 9, including a first guide tube surrounding said main measuring path, a second guide tube surrounding said reference paths and a third guide tube surrounding said temperature sensors, each of said guide tubes having openings through which an interior of a respective guide tube communicates with the surrounding liquid during operation.

11. The device according to claim 7, wherein said device for transmitting and receiving ultrasonic pulses is an ultrasonic transducer.

12. The device according to claim 10, wherein each guide tube has a first end and a second end, said device for transmitting and receiving ultrasonic pulses includes a respective separate ultrasonic transducer disposed at said first end of each guide tube, said ultrasonic transducers in said first and second guide tubes are disposed for emission in the direction of said second end of said first and second guide tubes, respectively, and said ultrasonic transducer in said third guide tube is disposed for emission in the direction of said first end of said third guide tube.

13. The device according to claim 12, wherein said ultrasonic transducer in said third guide tube is disposed offset towards said second end of said third guide tube as compared with said ultrasonic transducer in said first guide tube.

14. The device according to claim 12, including an additional ultrasonic transducer disposed at said first end in said guide tube surrounding said reference paths, for emitting in the direction from said first to said second end.

15. The device according to claim 14, including at least one reflector disposed downstream of said ultrasonic transducer at said first end in said guide tube surrounding the reference paths, in the direction from said first end to said second end.

16. The device according to claim 12, wherein one of said guide tubes is a hollow support arm connected to the container through a spherical joint and said spherical joint allows alignment of the device.

* * * * *